US011393235B2

(12) United States Patent
Li

(10) Patent No.: US 11,393,235 B2
(45) Date of Patent: Jul. 19, 2022

(54) FACE IMAGE QUALITY RECOGNITION METHODS AND APPARATUSES

(71) Applicant: Alipay Labs (Singapore) Pte. Ltd., Singapore (SG)

(72) Inventor: Jianshu Li, Hangzhou (CN)

(73) Assignee: ALIPAY LABS (SINGAPORE) PTE. Ltd., Singapore (SG)

(*) Notice: Subject to any disclaimer, the term of this patent is extended or adjusted under 35 U.S.C. 154(b) by 0 days.

(21) Appl. No.: 17/359,480

(22) Filed: Jun. 25, 2021

(65) Prior Publication Data
US 2022/0051010 A1 Feb. 17, 2022

(30) Foreign Application Priority Data

Aug. 11, 2020 (SG) .......................... 10202007655X

(51) Int. Cl.
*G06K 9/00* (2022.01)
*G06K 9/62* (2022.01)
(Continued)

(52) U.S. Cl.
CPC .......... *G06V 30/413* (2022.01); *G06K 9/628* (2013.01); *G06K 9/6227* (2013.01); *G06N 3/08* (2013.01);
(Continued)

(58) Field of Classification Search
CPC .......... G06F 21/32; G06F 21/36; G06F 21/40; G06K 9/00288; G06K 9/00456;
(Continued)

(56) References Cited

U.S. PATENT DOCUMENTS

| 2018/0276455 A1* | 9/2018 | An ........................ G06T 7/0002 |
| 2019/0147305 A1* | 5/2019 | Lu ......................... G06F 16/583 |
| | | 382/157 |

(Continued)

FOREIGN PATENT DOCUMENTS

| CN | 106203294 A | 12/2016 |
| CN | 108765407 A | 11/2018 |
| CN | 110765830 A | 2/2020 |

OTHER PUBLICATIONS

L. Best-Rowden and A. K. Jain, "Learning Face Image Quality From Human Assessments," in IEEE Transactions on Information Forensics and Security, vol. 13, No. 12, pp. 3064-3077, Dec. 2018, doi: 10.1109/TIFS.2018.2799585. (Year: 2018).*

(Continued)

*Primary Examiner* — Michael J Vanchy, Jr.
(74) *Attorney, Agent, or Firm* — Fish & Richardson P.C.

(57) ABSTRACT

Disclosed are computer-implemented methods, non-transitory computer-readable media, and systems for identity document face image quality recognition. One computer-implemented method includes pairing, for each user of a plurality of users and to form a pair of face images, an identity document (ID) face image and a live face image. For each pair of face images and based on a face similarity between the ID face image and the live face image, a similarity score for the ID face image is generated. Based on ID face images and similarity scores corresponding to the ID face images, a model for ID face image quality recognition is trained.

21 Claims, 5 Drawing Sheets

(51) Int. Cl.
*G06N 3/08* (2006.01)
*G06V 30/413* (2022.01)
*G06V 40/16* (2022.01)
*G06V 40/40* (2022.01)

(52) U.S. Cl.
CPC .......... *G06V 40/161* (2022.01); *G06V 40/172* (2022.01); *G06V 40/45* (2022.01)

(58) Field of Classification Search
CPC ............. G06K 9/00899; G06K 9/6288; G06K 2209/01; G06K 2209/25; G06K 9/00087; G06K 9/00261; G06K 9/00268; G06K 9/00469; G06K 9/00906; G06K 9/2054; G06K 9/325; G06K 9/344; G06K 9/46; G06K 9/4628; G06K 9/6215; G06K 9/6247; G06K 9/6269; G06K 9/6273; G06K 9/629; G06K 9/64; G06N 20/10; G06N 3/04; G06N 3/0454; G06N 3/08; G06Q 20/341; G06Q 20/3674; G06Q 20/40145; G06Q 20/4016; G06Q 20/42; G06Q 40/02; H04W 12/06

See application file for complete search history.

(56) References Cited

U.S. PATENT DOCUMENTS

2020/0042772 A1* 2/2020 Feng ..................... G06K 9/6215
2020/0042773 A1* 2/2020 Benkreira ............. G06V 20/62
2020/0143377 A1 5/2020 Lam et al.

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

* cited by examiner

300

350

FACE IMAGE QUALITY RECOGNITION METHODS AND APPARATUSES

CROSS-REFERENCE TO RELATED APPLICATIONS

This application claims priority to Singapore Patent Application No. 10202007655X, filed on Aug. 11, 2020, which is hereby incorporated by reference in its entirety.

TECHNICAL FIELD

The present specification relates broadly, but not exclusively, to methods and apparatuses for face image quality recognition.

BACKGROUND

Electronic-Know Your Customer (eKYC) is a digital due diligence process performed electronically by a business, which can verify the authenticity of its clients for assessing potential risks of illegal intentions towards the business relationship. To complete an eKYC process, a person may need to submit an image of a government-recognized photo identity document (ID) to prove his/her identity. In this context, there may be a need to control the quality of the ID images for effective face recognition.

One of the major issues in the eKYC scenarios relates to low quality face images on the IDs. To date, a conventional approach to check the quality of face images is to treat it as a binary classification task, by training a binary classification model and outputting two classes: face images with acceptable quality and unacceptable quality. However, manual labelling involved in training the model can be extensive and quite time consuming to obtain a model of high accuracy.

SUMMARY

Described embodiments provide methods, apparatuses, devices, and systems for face image quality recognition of an identity document (ID). In some embodiments, for a collection of users in an electronic-Know Your Customer (eKYC) system, a user's ID face image can be paired with the user's live face image. A face similarity score can be generated based on the paired images. In some embodiments, one can rank all the generated face similarity scores, and a ranking can represent the quality of the ID face image. Based on the rankings of the ID face images, a face quality recognition model can be trained.

In some implementations, the face quality recognition model can be a multiclass classification model. During the training, after ranking the ID face images based on the face similarity scores, the ID face images can be given different labels. For example, ID face images in bottom 10 percentile of the ranking are given label 0, in the next 10 percentile are given label 1, and finally ID face images in top 10 percentile of the ranking are given label 9 to train a 10-way classifier. In some implementations, the face quality recognition model can also be a regression model trained based on the ID face images and their corresponding face similarity scores. In some implementations, the multiclass classification model or the regression model for face image quality recognition can be convolutional neural network (CNN)-based. In some implementations, after finding the pairs of ID face image and live face image, a no-reference image quality model and a face pose estimation model can be used to remove live faces with low image quality and faces with non-frontal poses.

According to one embodiment, there is provided a computer-implemented method including: pairing, for each of a plurality of users, an ID face image and a live face image to form a pair of face images; generating, for each pair of face images, a similarity score for the ID face image based on a face similarity between the each pair of face images; and training, based on the ID face images and similarity scores corresponding to the ID face images, a model for ID face image quality recognition. According to another embodiment, there is provided a method for image quality recognition, including: receiving an ID face image of a user; inputting the ID face image to a model for ID face image quality recognition, wherein the model is trained according to the method in the previous embodiment; and determining a quality of the ID face image based on an output of the model.

According to other embodiments, one or more of these general and specific embodiments may be implemented using an apparatus including a plurality of modules, a system, a method, or a computer-readable media, or any combination of devices, systems, methods, and computer-readable media. The foregoing and other described embodiments can each, optionally, include some, none or all of the following embodiments.

BRIEF DESCRIPTION OF THE DRAWINGS

Embodiments and implementations are provided by way of example only, and will be better understood and readily apparent to one of ordinary skill in the art from the following written description, read in conjunction with the drawings, in which.

Figure 1:
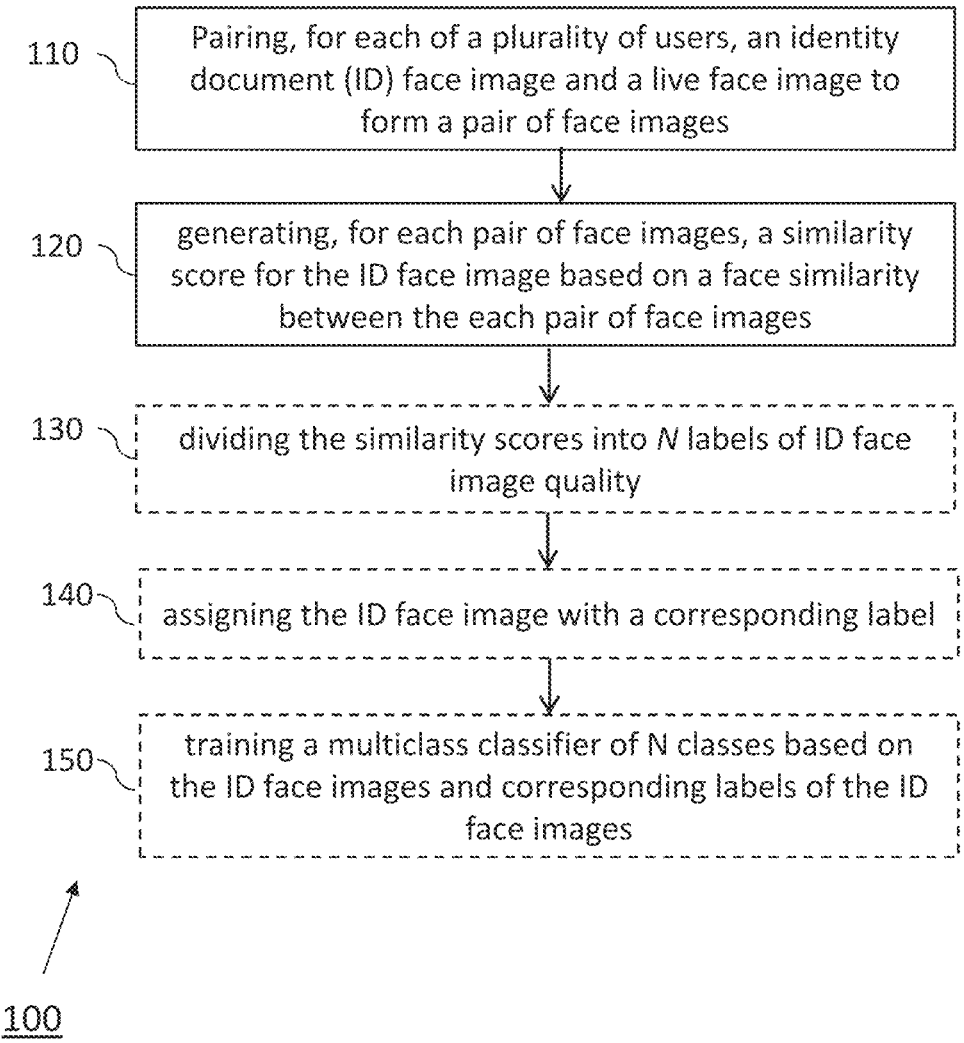
FIG. 1 is a flow chart illustrating an example of a computer-implemented method for training a face image quality recognition model, according to an embodiment.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

Embodiments will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "receiving", "generating", "obtaining", "determining", "predicting", "pairing", "matching", "dividing", "classifying", "excluding", "removing", "entering", "calculating", "setting", "defining", "comparing", "processing", "training", "updating", ""selecting", "authenticating", "providing", "inputting", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatuses for performing the operations of the methods. Such apparatuses may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer suitable for executing the various methods/processes described herein will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the specification contained herein. Moreover, the computer program is not intended to be limited to any particular control flow. There are many other variants of the computer program, which can use different control flows without departing from the scope of the specification.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the method.

The present specification may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC) or Field Programmable Gate Array (FPGA). Numerous other possibilities exist. Those skilled in the art will appreciate that the system can also be implemented as a combination of hardware and software modules.

Face image quality recognition in the act or process of assessing the quality of an ID image can be considered as a form of fraud detection or fake identity detection, in which legitimacy of users are verified and potential fraudsters may be detected before fraudulent acts are carried out. Effective identity authentication can enhance data security of systems by permitting the authenticated users to access its protected resources. Embodiments seek to provide methods and systems for effective and accurate face image quality recognition in photo IDs, thereby detecting ID images with unacceptable qualities and preventing access of potential fraudsters. Advantageously, financial risks such as money laundering and fraud can be effectively reduced or eliminated.

The techniques described in this specification produce one or more technical effects. A self-supervised face quality training method is provided to recognize the quality of faces on IDs (e.g. ID cards, passports), by relating a distribution of the quality to a distribution of face similarity scores of paired ID face images and live face images. Different from a binary classification technique, which takes extensive work to label numerous ID face images with good or poor qualities, no manual data labelling process is involved for this training method. Further, the trained face quality recognition model can be a regression model or a multiclass classifier. When a new ID image is received, the ID face image quality can be quantified or classified into one of various levels, instead of merely "good" or "poor" quality. Advantageously, depending on the requirements in practical implementations, a user of the model can set and adjust the quality selection criteria more accurately, in order to determine accept or reject certain qualities of ID face images.

FIG. 1 is a flow chart 100 illustrating an example method for training a face image quality recognition model. The trained model, which may be a regression model or a multiclass classification model, can be used for quality recognition of ID face images. In an embodiment, the trained model is a multiclass classification model, and the example method includes the following steps:

110: pairing, for each of a plurality of users, an ID face image and a live face image to form a pair of face images;

120: generating, for each pair of face images, a similarity score for the ID face image based on a face similarity between the each pair of face images;

130: dividing the similarity scores into N labels of ID face image quality;

140: assigning the ID face image with a corresponding label; and

150: training a multiclass classifier of N classes based on the ID face images and corresponding labels of the ID face images.

At step 110, a user's ID face image can be paired with the user's live face image to form a pair of face images of the user. An ID face image may refer to a face image on a photo ID. A photo ID can be in a form of a card (such as a national identity cards or a driver license), a document (such as a passport or a birth certificate), or the like. A live face image may refer to a face image captured from a live person. In some implementations, a live face image can be a face image collected during an eKYC process or captured during biometric authentication (such as unlocking a smartphone or accessing a mobile application). In some implementations, the method for training a face image quality recognition model can be applicable to an eKYC system that has been in use for a period of time with a certain amount of users in the system. In the example of an eKYC system, pairing a user's ID face image and corresponding live face image can be done based on users' unique identifiers in the eKYC system. Advantageously, abundant paired images for all the users can be obtained automatically and efficiently. Pairing users' ID face images and corresponding live face images can also be done by other known techniques. The implementations are not limited. In some implementations, one ID face image and one live face image may be associated with a user. In some implementations, multiple live face images may be associated with a user, and any one of the live face images may be used to pair with the ID face image.

In some embodiments, the live face images may be pre-screened to determine if they meet one or more predetermined standards, and live face images not meeting the one or more predetermined standards can be removed or excluded before proceeding to subsequent steps. In some implementations, a no-reference image quality model can be used to remove faces with a low image quality. A face pose estimation model can also be used to remove faces with a non-frontal pose. Advantageously, the pre-screening can exclude live face images that are not suitable as a comparison reference, thus improves the model accuracy.

At step 120, a similarity score can be generated for the ID face image based on a face similarity between the each pair of face images. A high similarity score may indicate that the face in the ID face image is highly similar to the face in the live face image, which can happen when the quality of the ID face image is high. In some implementations, the similarity scores can be generated using machine learning techniques, such as by face recognition models that take in two faces and output a similarity score between the two faces, or the like.

Following steps 110 and 120, based on the ID face images and similarity scores corresponding to the ID face images, a model for ID face image recognition can be trained. In some embodiments, the trained model can be a regression model that normalizes the similarity scores to a fixed range (e.g. 0-1). In some embodiments, the method may proceed to steps 130, 140 and 150 and train a multiclass classifier.

At step 130, the generated similarity scores can be divided into N labels of face image quality. In some implementations, the generated similarity scores may be ranked first, and the ranking of the similarity scores can be used to rank the quality of the ID face images. Subsequently, the ranked similarity scores can be divided into different labels, for example, the bottom 10 percentile is given label 0, the next 10 percentile is given label 1, so on and so forth, and the top 10 percentile is given label 9, to divide into 10 different label. Besides numeric labels, the labels can be ratings (e.g., very low/low/medium/high/very high, or poor/average/good/excellent), and the number of labels can be user-defined (e.g., 4, 5, 10, 20, 100). The implementations are not limited.

At step 140, each of the ID face images can be assigned with a corresponding label. One may appreciate that the ID face images have now been labelled based on the quality ranking of the ID face images, and no manual labelling was involved throughout the process. At step 150, a multiclass classifier of N classes can be trained as the face image quality recognition model based on the ID face images and their corresponding labels. In some embodiments, the multiclass classifier can be a CNN-based classifier, or the like. Alternatively, a regression model can be trained after steps 110 and 120 instead of a classification model. In some embodiments, the regression model can be a CNN-based model.

The present specification may further provide methods, apparatuses, and systems for using a face image quality recognition model to assess the quality of a new users' ID face image, the face image quality recognition model being trained by the methods described hereinabove. When a new user's ID face image is received (e.g., by uploading an image of a photo ID), the ID face image is inputted to the model, and the quality of the ID face image can be determined. In the case of a multiclass classifier model trained according to the previous methods, a class of the ID face image can be outputted (e.g. "Class 2"), and the quality of the ID face image can be determined based on the class (e.g. "Class 2" may be low quality in a scale of 0 to 9, 9 being top 10 percentile of quality). In the case of a regression model trained according to the previous methods, a score for the ID face image can be outputted (e.g. "0.91"), and the quality of the ID face image can be determined based on the score (e.g. "0.91" may be high quality in a normalized range of 0-1, 1 being best quality with the highest similarity score).

For example implementations in an eKYC system, a user of the multiclass classifier may be able to set quality recognition criteria, by selecting one or more classes as acceptable quality. Advantageously, if a new user's ID face image is classified as a class not within the one or more selected classes, the ID face image can be automatically rejected and prevented from entering the eKYC system, which improves the overall success rate of the eKYC. One may also appreciate that, in a regression model or a multiclass classifier, the quality recognition criteria can be set and tuned easily and more accurately, comparing with a binary classifier. For example, for services with a moderate financial risk level, the eKYC system may set the quality recognition criteria as "class 5 and above". For services with a high financial risk level, the eKYC system may set the quality recognition criteria as "class 8 and class 9". The implementations are not limited.

Figure 2:
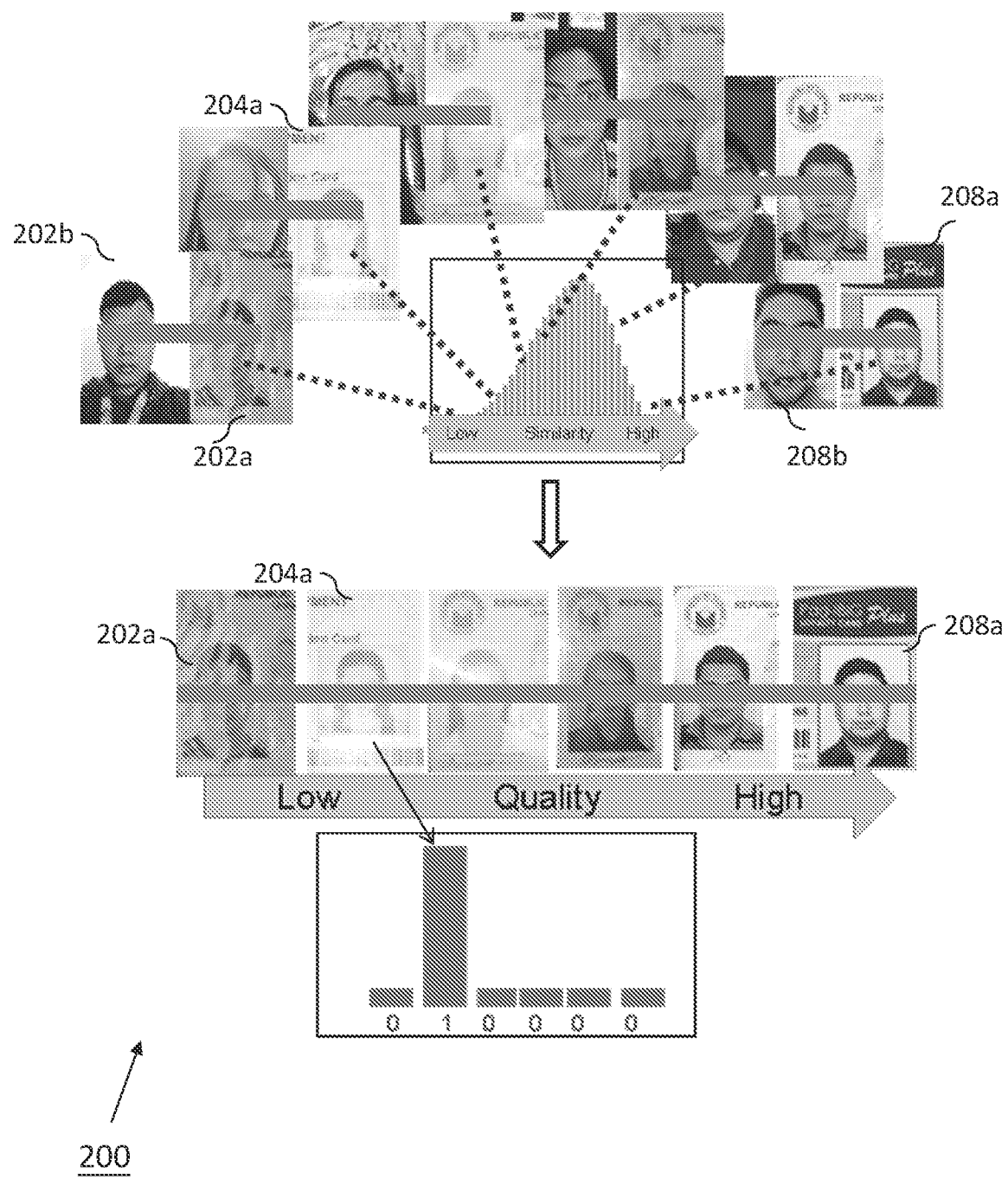
FIG. 2 is a flow diagram illustrating an example of an implementation of the method in FIG. 1, according to an embodiment.

FIG. 2 is an example flow diagram 200 illustrating an implementation of the method in FIG. 1. As shown in the top part of the flow diagram, ID face images and live face images of multiple users are paired, and a face similarity score is generated for each paired images. One may appreciate that a face in a high-quality ID face image tends to be very similar with a face in a live face image of the same person. For example, by comparing ID face image 208a with its paired live face image 208b, a high similarity score is likely to be generated. In contrast, by comparing ID face image 202a with its paired live face image 202b, a low similarity score is likely to be generated. When sufficient data is collected for training the model, one may observe a distribution pattern for the face similarity scores. In some embodiments, the face similarity scores can be normally distributed as shown in the figure.

Next, based on the face similarity scores, the ID face images can be ranked on a scale of low quality to high quality. As the face similarity score between ID face image 202a and paired live face image 202b is low, the ID face image 202a may be ranked as low quality, and vice versa for ID face image 208a. Upon ranking, each ID face image may be assigned a quality label. For example, all the ID face images can be divided into 6 quality labels, and ID face image 204a is assigned to the second quality label, as demonstrated by the one-hot representation in the figure. In different implementations, all the ID face images can be divided into 3 or 4 quality labels instead, and ID face images 202a and 204a may be assigned the same quality label. The implementations are not limited. After quality labelling of the ID face images, the method may proceed to train a face quality recognition model, such as a classification model as shown in FIG. 3A.

Figure 3A:
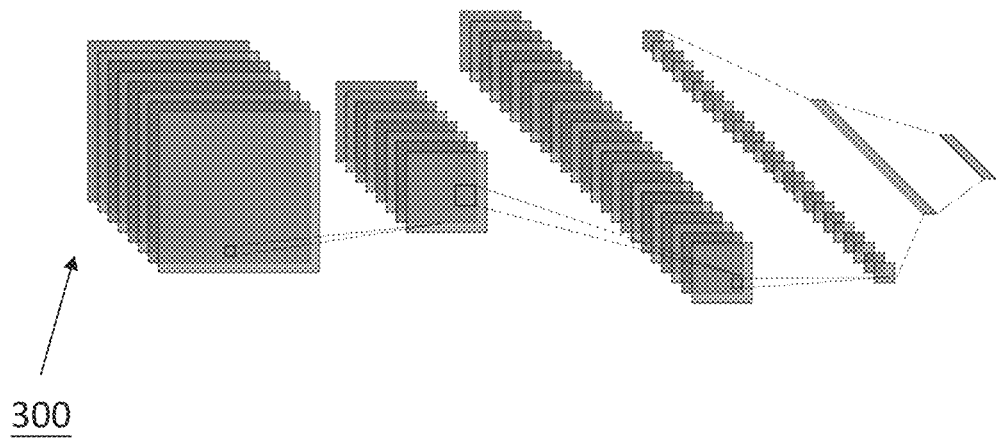
FIGS. 3A and 3B are schematics of examples of a classification network and a regression network, respectively, according to an embodiment.
Figure 3B:
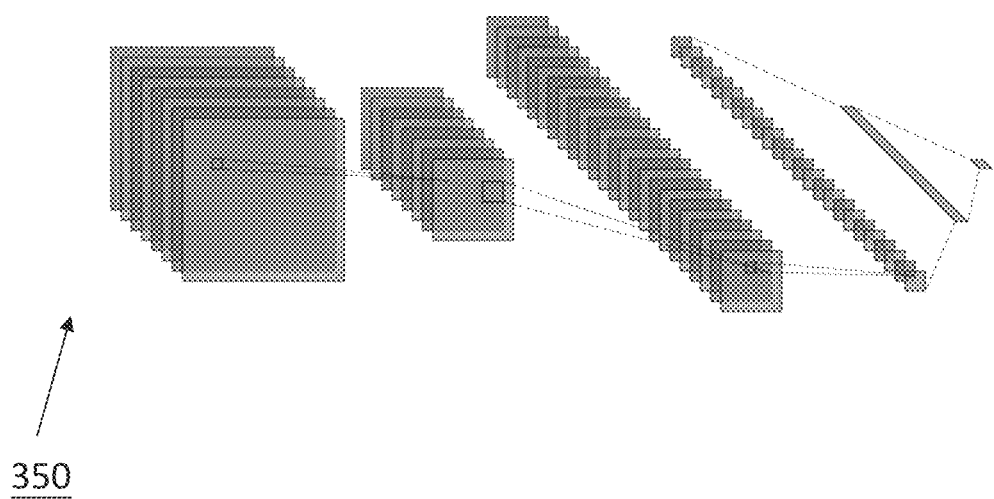

FIG. 3A is a schematic 300 of an example of a classification network. After all the ID face images are assigned with a quality label, a multiclass face image quality recognition model can be trained based on CNN. Alternatively, a regression face image quality recognition model can be trained based on the ID face images and their corresponding face similarity scores, without dividing the ID face images into different labels. A schematic 350 of an example of a regression network is demonstrated in FIG. 3B. As shown in the figures, a classification network may output prediction probabilities for different labels and a regression network may output a value or a quantity. One may appreciate that other implementations and/or combinations of models may be used without departing from the scope of the specification, depending on the desired outputs.

One may appreciate that training the model and using the model for face image quality recognition can be two separate processes, performed by either the same party or different parties. Further, the ID face image quality recognition method for can be implemented alone or in combination with other methods of identity verification and identity proofing. The implementations are not limited.

Figure 4:
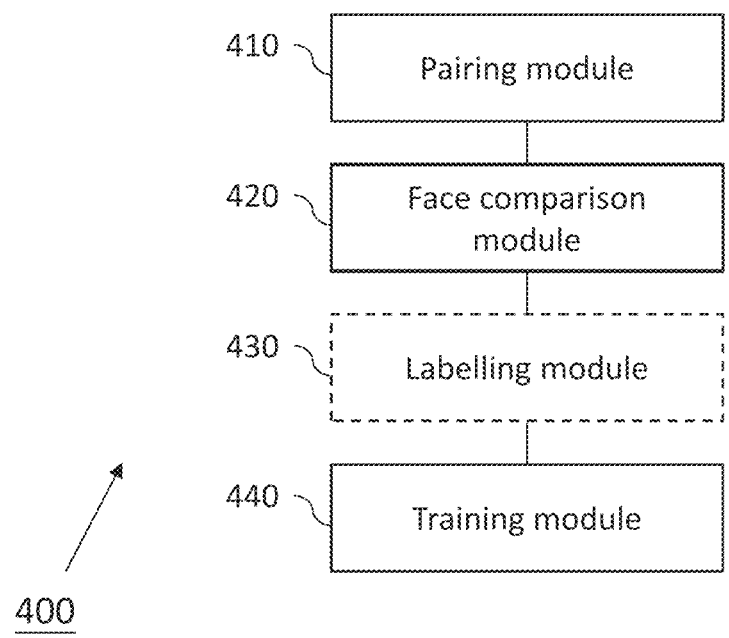
FIG. 4 is a schematic diagram of an example of modules of an apparatus for face image quality recognition, according to an embodiment.

FIG. 4 is a schematic diagram of an example apparatus 400 including modules for face image quality recognition. The apparatus 400 at least includes a pairing module 410, a face comparison module 420, and a training module 440. With reference to FIG. 1 and FIG. 2, the pairing module 410 can be configured to pair a user's ID face image and live face image. The face comparison module 420 can be configured to compare the face similarity in the paired images and generate a face similarity score. When a classification model is trained, the apparatus may additionally include a labelling module 430 configured to label the ID face images based on the generated similarity scores. Further, the apparatus 400 may also include a ranking module to rank the ID face images by ranking the generated similarity scores. The training module 440 can be configured to train a face image quality recognition model, such as a multiclass classifier based on the ID face images and their corresponding labels, or a regression model based on the ID face images and their corresponding face similarity scores. The apparatus 400 may additionally include a no-reference image quality module and/or a face pose estimation module configured to determine the quality of the live face images and/or the poses in the live face images. The apparatus 400 may also include a receiving module configured to receive image data of a new user's ID face image. In the case of a classification model, the apparatus 400 may also include a classification module configured to predict a class of the new user's ID face image, and an output module configured to output the predicted class or output a quality of the ID face image based on the predicted class. The apparatus 400 may further include a quality recognition module, which is configured to set quality recognition criteria for the ID face images and to accept or reject an ID face image depending on whether the ID face image meets the quality recognition criteria (e.g. certain classes or above a certain score). One or more or any combination of these modules can be part of an apparatus for detecting photograph replacement in a photo ID.

The system, apparatus, module, or unit illustrated in the previous embodiments can be implemented by using a computer chip or an entity, or can be implemented by using a product having a certain function. A typical embodiment device is a computer (and the computer can be a personal computer), a laptop computer, a cellular phone, a camera phone, a smartphone, a personal digital assistant, a media player, a navigation device, an email receiving and sending device, a game console, a tablet computer, a wearable device, or any combination of these devices. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Figure 5:
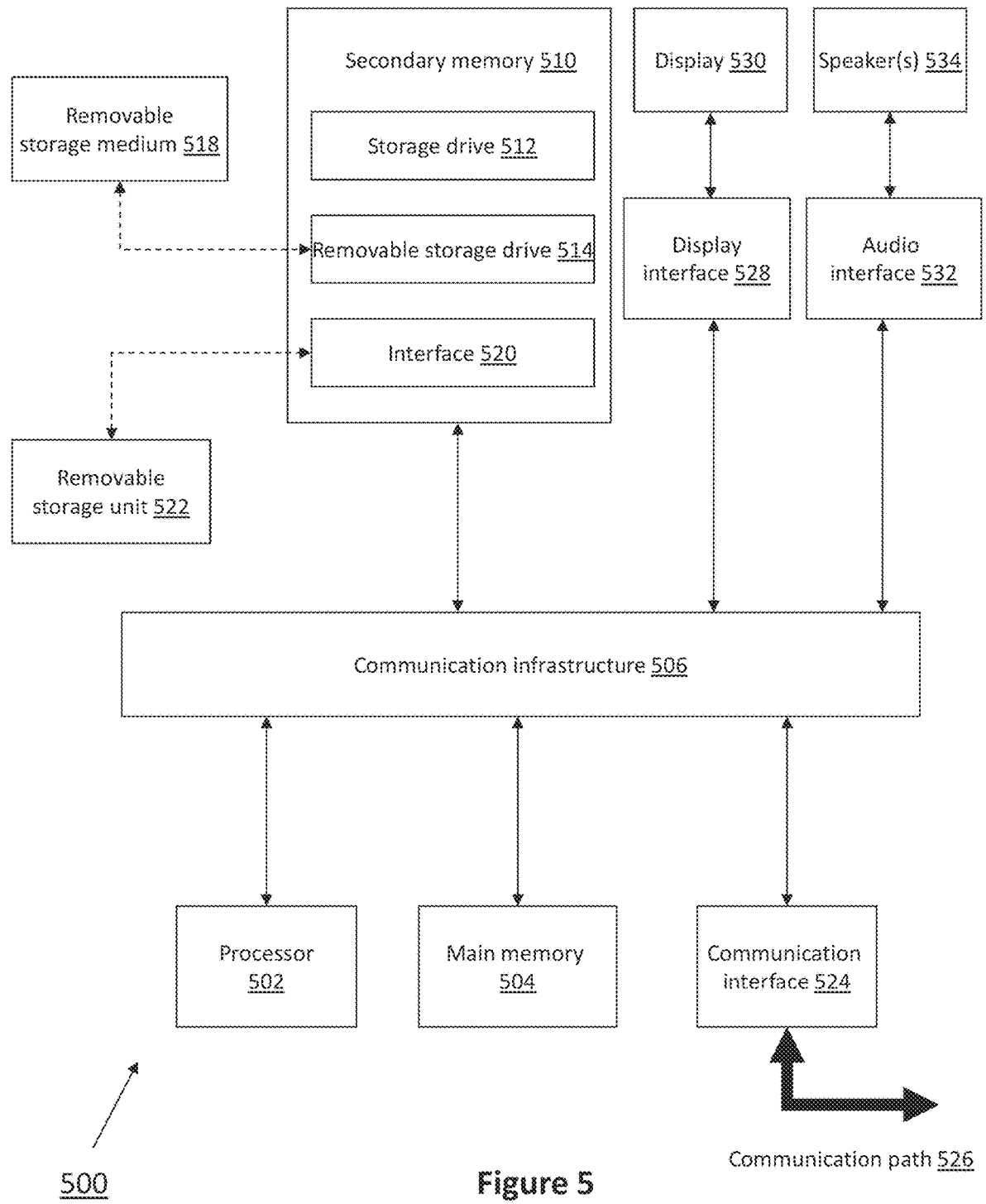
FIG. 5 is a block diagram of an example of a computer system suitable for executing at least some steps of the example methods shown in FIGS. 1 and 2, according to an embodiment.

FIG. 5 is a block diagram of an example computer system 500 suitable for executing at least some steps of the example methods shown in FIGS. 1 and 2. The following description of the computer system/computing device 500 is provided by way of example only and is not intended to be limiting.

As shown in FIG. 5, the example computing device 500 includes a processor 502 for executing software routines. Although a single processor is shown for the sake of clarity, the computing device 500 may also include a multi-processor system. The processor 502 is connected to a communication infrastructure 506 for communication with other components of the computing device 500. The communication infrastructure 506 may include, for example, a communications bus, cross-bar, or network.

The computing device 500 further includes a main memory 504, such as a random access memory (RAM), and a secondary memory 510. The secondary memory 510 may include, for example, a storage drive 512, which may be a hard disk drive, a solid state drive or a hybrid drive and/or a removable storage drive 514, which may include a magnetic tape drive, an optical disk drive, a solid state storage drive (such as a USB flash drive, a flash memory device, a solid state drive or a memory card), or the like. The removable storage drive 514 reads from and/or writes to a removable storage medium 518 in a well-known manner. The removable storage medium 518 may include magnetic tape, optical disk, non-volatile memory storage medium, or the like, which is read by and written to by removable storage drive 514. As will be appreciated by persons skilled in the relevant art(s), the removable storage medium 518 includes a computer readable storage medium having stored therein computer executable program code instructions and/or data.

In an alternative implementation, the secondary memory 510 may additionally or alternatively include other similar means for allowing computer programs or other instructions to be loaded into the computing device 500. Such means can include, for example, a removable storage unit 522 and an interface 520. Examples of a removable storage unit 522 and interface 520 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 522 and interfaces 520 which allow software and data to be transferred from the removable storage unit 522 to the computer system 500.

The computing device 500 also includes at least one communication interface 524. The communication interface 524 allows software and data to be transferred between computing device 500 and external devices via a communication path 526. In various embodiments of the specification, the communication interface 524 permits data to be transferred between the computing device 500 and a data communication network, such as a public data or private data communication network. The communication interface 524 may be used to exchange data between different computing devices 500 which such computing devices 500 form part an interconnected computer network. Examples of a communication interface 524 can include a modem, a network interface (such as an Ethernet card), a communication port (such as a serial, parallel, printer, GPIB, IEEE 1394, RJ45, USB), an antenna with associated circuitry and the like. The communication interface 524 may be wired or may be wireless. Software and data transferred via the communication interface 524 are in the form of signals which can be electronic, electromagnetic, optical or other signals capable of being received by communication interface 524. These signals are provided to the communication interface via the communication path 526.

As shown in FIG. 5, the computing device 500 further includes a display interface 528 which performs operations for rendering images to an associated display 530 and an audio interface 532 for performing operations for playing audio content via associated speaker(s) 534.

As used herein, the term "computer program product" may refer, in part, to removable storage medium 518, removable storage unit 522, a hard disk installed in storage drive 512, or a carrier wave carrying software over communication path 526 (wireless link or cable) to communication interface 524. Computer readable storage media refers to any non-transitory, non-volatile tangible storage medium that provides recorded instructions and/or data to the computing device 500 for execution and/or processing. Examples of such storage media include magnetic tape, CD-ROM, DVD, Blu-Ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 500. Examples of transitory or non-tangible computer readable transmission media that may also participate in the provision of software, application programs, instructions and/or data to the computing device 500 include radio or infra-red transmission channels as well as a network connection to another computer or networked device, and the Internet or Intranets including e-mail transmissions and information recorded on Websites and the like.

The computer programs (also called computer program code) are stored in main memory 504 and/or secondary memory 510. Computer programs can also be received via the communication interface 524. Such computer programs, when executed, enable the computing device 500 to perform one or more features of embodiments discussed herein. In various embodiments, the computer programs, when executed, enable the processor 607 to perform features of the above-described embodiments. Accordingly, such computer programs represent controllers of the computer system 500.

Software may be stored in a computer program product and loaded into the computing device 500 using the removable storage drive 514, the storage drive 512, or the interface 520. The computer program product may be a non-transitory computer readable medium. Alternatively, the computer program product may be downloaded to the computer system 500 over the communication path 526. The software, when executed by the processor 502, causes the computing device 500 to perform the necessary operations to execute the method as shown in FIGS. 1 and 2.

It is to be understood that the embodiment of FIG. 5 is presented merely by way of example to explain the operation and structure of the system 500. Therefore, in some embodiments one or more features of the computing device 500 may be omitted. Also, in some embodiments, one or more features of the computing device 500 may be combined together. Additionally, in some embodiments, one or more features of the computing device 500 may be split into one or more component parts.

It will be appreciated that the elements illustrated in FIG. 5 function to provide means for performing the various functions and operations of the system as described in the above embodiments.

It will be appreciated by a person skilled in the art that numerous variations and/or modifications may be made to the present specification as shown in the specific embodiments without departing from the scope of the specification as broadly described. The present embodiments are, therefore, to be considered in all respects to be illustrative and not restrictive.

What is claimed is:

1. A computer-implemented method for identity document face image quality recognition, comprising:
    pairing, for each user of a plurality of users and to form a pair of face images, an identity document (ID) face image and a live face image;
    generating, for each pair of face images and based on a face similarity between the ID face image and the live face image, a similarity score for the ID face image; and
    training, based on ID face images and similarity scores corresponding to the ID face images, a model for ID face image quality recognition by:
        ranking the similarity scores corresponding to the ID face images based on a quality of each of the ID face images;
        dividing the ranked similarity scores into N percentiles, wherein N is greater than two; and
        assigning N labels of ID face image quality corresponding to the N percentiles of the ranked similarity scores, wherein the N labels of ID face image quality represent a scale of a predefined range indicating qualities of the ID face images.

2. The computer-implemented method of claim 1, wherein training the model for ID face image quality recognition comprises training a multiclass classifier.

3. The computer-implemented method of claim 2, wherein training the multiclass classifier comprises:
    dividing the ranked similarity scores into the N labels of ID face image quality;
    assigning an ID face image with a corresponding label; and
    training a multiclass classifier of N classes based on the ID face images and corresponding labels of the ID face images.

4. The computer-implemented method of claim 3, wherein dividing the ranked similarity scores into the N labels of ID face image quality is percentile-based.

5. The computer-implemented method of claim 1, wherein training a model for ID face image quality recognition comprises training a regression model.

6. The computer-implemented method of claim 1, further comprising, prior to generating the similarity score for the ID face image:
- determining, for each of the plurality of users, if the live face image meets one or more predetermined standards; and
- excluding the live face image in response to determining that the live face image does not meet the one or more predetermined standards.

7. The computer-implemented method of claim 6, wherein determining if the live face image meets the one or more predetermined standards comprises:
- using a no-reference image quality model and/or a face pose estimation model to determine if the live face image meets the one or more predetermined standards; and
- excluding the live face image in response to determining that the live face image has a low image quality or a non-frontal pose.

8. The computer-implemented method of claim 1, wherein the similarity scores are normally distributed.

9. The computer-implemented method of claim 1, wherein the model is a convolutional neural network (CNN)-based model.

10. The computer-implemented method of claim 1, wherein the live face image comprises a face image collected during biometric authentication or collected during an electronic-Know Your Customer (eKYC) procedure.

11. A non-transitory computer-readable medium storing one or more instructions executable by a computer system to perform operations for identity document face image quality recognition, comprising:
- pairing, for each user of a plurality of users and to form a pair of face images, an identity document (ID) face image and a live face image;
- generating, for each pair of face images and based on a face similarity between the ID face image and the live face image, a similarity score for the ID face image; and
- training, based on ID face images and similarity scores corresponding to the ID face images, a model for ID face image quality recognition by:
  - ranking the similarity scores corresponding to the ID face images based on a quality of each of the ID face images;
  - dividing the ranked similarity scores into N percentiles, wherein N is greater than two; and
  - assigning N labels of ID face image quality corresponding to the N percentiles of the ranked similarity scores, wherein the N labels of ID face image quality represent a scale of a predefined range indicating qualities of the ID face images.

12. The non-transitory computer-readable medium of claim 11, wherein training the model for ID face image quality recognition comprises training a multiclass classifier.

13. The non-transitory computer-readable medium of claim 12, wherein training the multiclass classifier comprises:
- dividing the ranked similarity scores into the N labels of ID face image quality;
- assigning an ID face image with a corresponding label; and
- training a multiclass classifier of N classes based on the ID face images and corresponding labels of the ID face images.

14. The non-transitory computer-readable medium of claim 13, wherein dividing the ranked similarity scores into the N labels of ID face image quality is percentile-based.

15. The non-transitory computer-readable medium of claim 11, wherein training a model for ID face image quality recognition comprises training a regression model.

16. The non-transitory computer-readable medium of claim 11, further comprising, prior to generating the similarity score for the ID face image:
- determining, for each of the plurality of users, if the live face image meets one or more predetermined standards; and
- excluding the live face image in response to determining that the live face image does not meet the one or more predetermined standards.

17. The non-transitory computer-readable medium of claim 16, wherein determining if the live face image meets the one or more predetermined standards comprises:
- using a no-reference image quality model and/or a face pose estimation model to determine if the live face image meets the one or more predetermined standards; and
- excluding the live face image in response to determining that the live face image has a low image quality or a non-frontal pose.

18. The non-transitory computer-readable medium of claim 11, wherein the similarity scores are normally distributed.

19. The non-transitory computer-readable medium of claim 11, wherein the model is a convolutional neural network (CNN)-based model.

20. The non-transitory computer-readable medium of claim 11, wherein the live face image comprises a face image collected during biometric authentication or collected during an electronic-Know Your Customer (eKYC) procedure.

21. A computer-implemented system for identity document face image quality recognition, comprising:
- one or more computers; and
- one or more computer memory devices interoperably coupled with the one or more computers and having tangible, non-transitory, machine-readable media storing one or more instructions that, when executed by the one or more computers, cause the one or more computers to perform one or more operations comprising:
  - pairing, for each user of a plurality of users and to form a pair of face images, an identity document (ID) face image and a live face image;
  - generating, for each pair of face images and based on a face similarity between the ID face image and the live face image, a similarity score for the ID face image; and
  - training, based on ID face images and similarity scores corresponding to the ID face images, a model for ID face image quality recognition by:
    - ranking the similarity scores corresponding to the ID face images based on a quality of each of the ID face images;
    - dividing the ranked similarity scores into N percentiles, wherein N is greater than two; and
    - assigning N labels of ID face image quality corresponding to the N percentiles of the ranked similarity scores, wherein the N labels of ID face image quality represent a scale of a predefined range indicating qualities of the ID face images.

\* \* \* \* \*